United States Patent Office

3,010,925
Patented Nov. 28, 1961

3,010,925
ACRYLIC ESTERS OF CASTOR OIL
John W. Lynn, Charleston, W. Va., assignor to Union Carbide Corporation, a corporation of New York
No Drawing. Filed Sept. 17, 1959, Ser. No. 840,507
7 Claims. (Cl. 260—23)

This invention relates to novel chemical compounds and to compositions containing the same. More particularly the invention concerns the synthesis of acrylic esters of castor oil and their use as polymerizable plasticizers for vinyl resins.

The required amount of a liquid ester plasticizer for making a plastisol tends to yield a product which, when cured, is too soft and elastic for many of its intended uses. In order to render the plastisol technique more versatile and also improve plasticized products, efforts have been made to find liquid polymerizable plasticizers for vinyl resins which will provide a fluid dispersion at room temperature and cure rapidly in the presence of the usual polymerization catalysts at suitable temperatures for dispersion coatings. Although a variety of polymerizable plasticizers have been suggested, such materials have been limited to a large extent by the expense involved in their production, or by a general ineffectiveness due to their inadequate reactivity during the curing or baking cycle whereby the resin and plasticizer become incompatible.

The term "plastisol" as used herein refers to fluid suspensions of finely divided resinous polymers in liquid plasticizers. Organosols are distinguished therefrom in having part of the plasticizer replaced with a balanced volatile thinner.

According to the present invention dispersions of vinyl resins, which are useful as plastisols, organosols, and plastic compositions, are produced by intimately mixing, grinding, or stirring finely-divided resins, which are preferably of the dispersion type, with a polymerizable plasticizer comprising an acrylic ester of castor oil. The resultant dispersions, after processing to form films or other shaped articles, can be converted to the cured or gel state by heating at temperatures of 300 to 350° F. for 5 to 30 minutes to provide novel vinyl resin compositions in which the plasticizer forms a non-migrating and non-extractable component thereof.

The polymerizable plasticizers of the invention are acrylic or methacrylic acid esters of castor oil, referred to respectively as castor oil triacrylate and castor oil trimethacrylate, which can be exemplified by the following general formula in which R represents a hydrogen atom or methyl group.

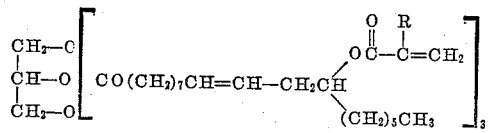

The esters conforming to the above structure are substantially odorless, pale yellow liquids of low volatility which can be obtained by reacting castor oil with acrylyl or methacrylyl chloride in the presence of a hydrogen chloride acceptor, e.g., a tertiary amine, or by reacting acrylic or methacrylic anhydride with castor oil by any of the conventional procedures used in the preparation of esters. With esterification techniques, for example, an equivalent weight of castor oil can be reacted with 1.1 to 1.5 equivalents of the acrylic material under liquid phase conditions at temperatures ranging from 20° C. to 100° C., preferably about 20 to 80° C., with or without the presence of a significant amount of catalyst to help reduce the time required for equilibrium. Preferred catalysts, which can be used in amounts ranging from 0.01 to 1.0% by weight, based on the reaction mixture, include strong acids such as sulfuric acid, hydrochloric acid and the aromatic sulfonic acids, p-toluenesulfonic acid and ethanesulfonic acid. The reaction may be carried out in the presence of an inert solvent, e.g., benzene, toluene, xylene, naphtha and the like, under reduced, atmospheric or superatmospheric pressure.

Upon completion of the esterification reaction acidic bodies can be removed by treating the reaction mixture with sodium or sodium acrylate, etc. The reaction mixture may be further purified, if desired, by distillation at reduced pressures, usually in the presence of polymerization inhibitors such as finely divided copper, hydroquinone or quinone, to remove solvent and excess acrylic materials. The desired acrylate ester is recovered as a residue product.

The vinyl resins which can be plasticized to provide compositions in accordance with the invention include the well known vinyl resins such as polyvinyl butyral resins; polyvinyl chlorides; and copolymers of vinyl chloride and another polymerizable olefinically unsaturated compound such as vinyl acetate, vinyl propionate, methyl acrylate, butyl acrylate, methyl methacrylate, butyl methacrylate, acrylonitrile, vinylidene chloride and dibutyl maleate.

Dispersion-type resins made by emulsion polymerization are preferably employed, especially in the production of plastisols and organosols. Dispersion-type resins are not essential, however, since resins made by solution-type, bulk-type, and suspension-type polymerization processes can be used.

To obtain compositions of desirable physical properties the vinyl resins should be of high average molecular weights. The useful copolymers of vinyl chloride with other polymerizable monomers usually contain major amounts of the vinyl chloride. The preferred resins are polyvinyl chlorides, and copolymers of vinyl chloride with vinyl acetate containing about 85–99% by weight of the vinyl chloride. These resins and the other vinyl resins mentioned above can be employed in resin to plasticizer weight ratios in the range of about 4:1 to 1:1.

To facilitate the curing of the polymerizable plasticizer within the resin dispersion in a reasonable time, about 0.5% to 5% of a polymerization catalyst, based on the weight of the polymerizable plasticizer, is incorporated in the dispersion. While any of the usual peroxy polymerization catalysts such as benzoyl peroxide, acetyl peroxide, and the chlorine-substituted acyl peroxides are effective, it is preferred to employ t-butyl perbenzoate or benzoyl peroxide.

A polymerization inhibitor of the type above indicated, e.g., hydroquinone, may be present in the resin dispersion to inhibit premature polymerization of the plasticizer. The usual heat and light stabilizers, such as, for example dibutyl tin dilaurate, may also be present in the dispersion.

The polymerizable plasticizers of the invention are compatible with the various types of vinyl resins above described as well as the usual non-polymerizable ester plasticizers commonly used with these resins, such as the alkyl and aryl phosphates, the alkyl phthalates, adipates, sebacates, azelates, and epoxidized vegetable oils. Among these can be mentioned tri-(2-ethylhexyl) phosphate, tricresyl phosphate, di-(2-ethylhexyl) phthalate and the corresponding adipate, dioctyl sebacate, and epoxidized soya bean oils.

The following examples illustrate the best mode now contemplated for carrying out the invention. The castor oil which is utilized for purposes of the invention is a well known material consisting of the triglyceride of ricinoleic acid. In Example I a commercial grade of castor oil was used in which the average fatty acid composition analyzed, on a weight percent basis, approximately 86% ricinoleic acid, 8% oleic acid, 3% linoleic and 3% dihydroxy stearic acids.

*Example I*

A mixture of 93 grams (0.1 mol) of castor oil, 93 grams of benzene, 0.2 gram sulfuric acid and 0.2 gram of hydroquinone was warmed to reflux. A solution of 46 grams (0.3 mol) of methacrylic anhydride in 46 grams of benzene was added to the mixture over a five minute period. The reaction mixture was stirred at 80° C. for six hours and allowed to stand overnight. About 0.7 gram of sodium acetate was added and the precipitated sodium sulfate removed by filtration. The reaction mixture was stripped up to a temperature of 65° C. at 3 mm. pressure and then passed through a falling film evaporator at 0.007 mm. pressure to remove traces of anhydride. A residual pale yellow oil was obtained in almost a quantitative yield and contained 72.38% C; and 10.28% H; which corresponds to theoretical values of 72.8% C; and 10.2% H. Infrared spectrum is consistent with the assigned structure $C_{69}H_{116}O_{12}$. The product had a refractive index ($N_D{}^{30}$) of 1.4696.

By substituting acrylic anhydride for methacrylic anhydride, castor oil triacrylate is obtained in the same manner as described above.

*Example II*

A plastisol containing 100 parts of a dispersion-grade polyvinyl chloride, 60 parts castor oil trimethacrylate as prepared above in Example I and 1.8 parts t-butyl perbenzoate, all parts by weight, was stirred to make a smooth paste. The mixture was subjected to vacuum (6 mm.) for 15 to 20 minutes to remove air. Films were prepared from this plastisol in a thin film of about 7 mils wet thickness by casting on aluminum foil. The cast films were cured at 350° F. for 5 minutes. The cured films were flexible and free from tackiness.

*Example III*

A plastisol containing 100 parts of a dispersion-grade polyvinyl chloride, 30 parts castor oil trimethacrylate as prepared in Example I, 30 parts of di-(2-ethylhexyl) phthalate as a non-polymerizable plasticizer, all parts by weight, was prepared by stirring the plasticizers and resin together in the presence of 3% t-butyl perbenzoate, based on the weight of the polymerizable plasticizer. Films were made from the plastisol by casting on aluminum foil and curing for 5 minutes at 350° F. The cured films were flexible and somewhat opaque.

*Example IV*

A plastisol containing 100 parts of a resinous vinyl chloride-vinyl acetate copolymer analyzing 90 percent vinyl chloride, 30 parts of castor oil trimethacrylate as prepared in Example I, 30 parts of di-(2-ethylhexyl) phthalate as a non-polymerizable plasticizer, all parts by weight, was prepared by mixing the plasticizers and resin together in the presence of 3% t-butyl perbenzoate, based on the weight of the polymerizable plasticizer. Films were prepared from the plastisol by casting on aluminum foil and curing for 5 minutes at 350° F. The cured films were flexible and only slightly opaque.

What is claimed is:

1. As a new composition of matter, a compound having the formula:

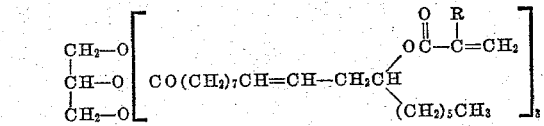

wherein R is a member selected from the group consisting of hydrogen and methyl.

2. Castor oil triacrylate.
3. Castor oil trimethacrylate.
4. A plasticized vinyl resin composition containing a vinyl resin and a polymerizable plasticizer having the formula:

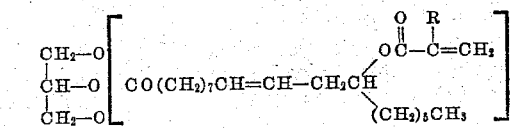

5. The composition of a claim 4 wherein the plasticizer is castor oil triacrylate.
6. The composition of claim 4 wherein the plasticizer is castor oil trimethacrylate.
7. A plasticized vinyl resin composition containing a finely-divided emulsion polymerized vinyl resin selected from the group consisting of polyvinyl chloride and copolymeres of vinyl chloride with a vinyl ester of a lower alkanoic acid and a polymerizable plasticizer having the formula:

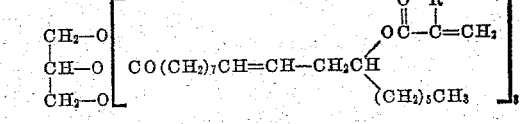

References Cited in the file of this patent

UNITED STATES PATENTS

| | | |
|---|---|---|
| 2,733,223 | Van Etten | Jan. 31, 1956 |
| 2,812,340 | Bader | Nov. 5, 1957 |

Disclaimer 3,010,925.—*John W. Lynn*, Charleston, W. Va. ACRYLIC ESTERS OF CASTOR OIL. Patent dated Nov. 28, 1961. Disclaimer filed Sept. 12, 1963, by the assignee, *Union Carbide Corporation*.

Hereby enters this disclaimer to claims 1 and 2 of said patent.

[*Official Gazette November 26, 1963.*]